US011673433B1

(12) United States Patent
Choizi

(10) Patent No.: US 11,673,433 B1
(45) Date of Patent: Jun. 13, 2023

(54) VEHICLE TIRE INFLATION SYSTEM

(71) Applicant: Jeff Choizi, Upper Darby, PA (US)

(72) Inventor: Jeff Choizi, Upper Darby, PA (US)

( * ) Notice: Subject to any disclaimer, the term of this patent is extended or adjusted under 35 U.S.C. 154(b) by 354 days.

(21) Appl. No.: 17/074,731

(22) Filed: Oct. 20, 2020

(51) Int. Cl.
*B60C 23/00* (2006.01)
(52) U.S. Cl.
CPC ................................ *B60C 23/004* (2013.01)
(58) Field of Classification Search
CPC .... B60C 23/004; B60C 23/10; B60C 23/0447
See application file for complete search history.

(56) References Cited

U.S. PATENT DOCUMENTS

| | | | |
|---|---|---|---|
| 4,418,737 A | 12/1983 | Goodell | |
| 5,325,902 A | 7/1994 | Loewe | |
| 5,587,698 A | 12/1996 | Genna | |
| 5,928,444 A | 7/1999 | Loewe | |
| 6,533,010 B1* | 3/2003 | Alonso | B60C 23/126 152/415 |
| 6,892,776 B2 | 5/2005 | Skoff | |
| 6,966,220 B2 | 11/2005 | Yueh | |
| 8,479,791 B2 | 7/2013 | Schulte | |
| 9,248,707 B2 | 2/2016 | Zhou | |
| 10,913,315 B1* | 2/2021 | Del Olmo | B60C 23/00354 |
| 2004/0007302 A1* | 1/2004 | Hamilton | B60C 23/041 152/416 |
| 2011/0203710 A1* | 8/2011 | Hinojosa, Jr. | B60C 23/10 152/419 |
| 2012/0234447 A1* | 9/2012 | Narloch | B60C 23/10 152/418 |
| 2014/0023518 A1* | 1/2014 | O'Brien | B60C 23/126 417/1 |
| 2018/0319228 A1* | 11/2018 | Durr | B60B 21/02 |

FOREIGN PATENT DOCUMENTS

DE 102019202320 A1 * 8/2020
EP 1362716 6/2006

OTHER PUBLICATIONS

Translation of DE 102019202320 A1, 8 pages (Year: 2020).*

* cited by examiner

*Primary Examiner* — S. Joseph Morano
*Assistant Examiner* — Emily G. Castonguay
(74) *Attorney, Agent, or Firm* — Kyle A. Fletcher, Esq.

(57) ABSTRACT

The vehicle tire inflation system comprises an air jacket and an air hose. The air jacket may reside within a wheel of a vehicle and may be mounted to the inside of a rim of the wheel. The air jacket may determine that a tire of the wheel has at least partially deflated by sensing that tire pressure within the wheel has dropped below a first pressure threshold. The air jacket may release compressed air within the wheel until the air jacket senses that the tire pressure has reached a second pressure threshold such that the tire may be reinflated. The air hose may be configured to couple the air jacket to a tire pressure monitoring system such that the air jacket has access to an external air supply located outside of the wheel via the tire pressure monitoring system.

17 Claims, 3 Drawing Sheets

VEHICLE TIRE INFLATION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of automotive accessories, more specifically, a vehicle tire inflation system.

SUMMARY OF INVENTION

The vehicle tire inflation system comprises an air jacket and an air hose. The air jacket may reside within a wheel of a vehicle and may be mounted to the inside of a rim of the wheel. The air jacket may determine that a tire of the wheel has at least partially deflated by sensing that tire pressure within the wheel has dropped below a first pressure threshold. The air jacket may release compressed air within the wheel until the air jacket senses that the tire pressure has reached a second pressure threshold such that the tire may be reinflated. The air hose may be configured to couple the air jacket to a tire pressure monitoring system such that the air jacket has access to an external air supply located outside of the wheel via the tire pressure monitoring system.

An object of the invention is to re-inflate a tire that has lost air pressure.

Another object of the invention is to activate an air source located within the wheel to release compressed air into a tire when the tire pressure is found to be below a first threshold.

A further object of the invention is to deactivate the air source and stop the release of compressed air into the tire when the tire pressure is found to be above a second threshold.

Yet another object of the invention is to transmit a low tire pressure alert from a tire pressure monitoring system when the tire pressure within a wheel is found to be below a third threshold.

These together with additional objects, features and advantages of the vehicle tire inflation system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle tire inflation system in detail, it is to be understood that the vehicle tire inflation system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle tire inflation system.

It is therefore important that the claims be regarded as including such equivalent construction insofar as they do not depart from the spirit and scope of the vehicle tire inflation system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
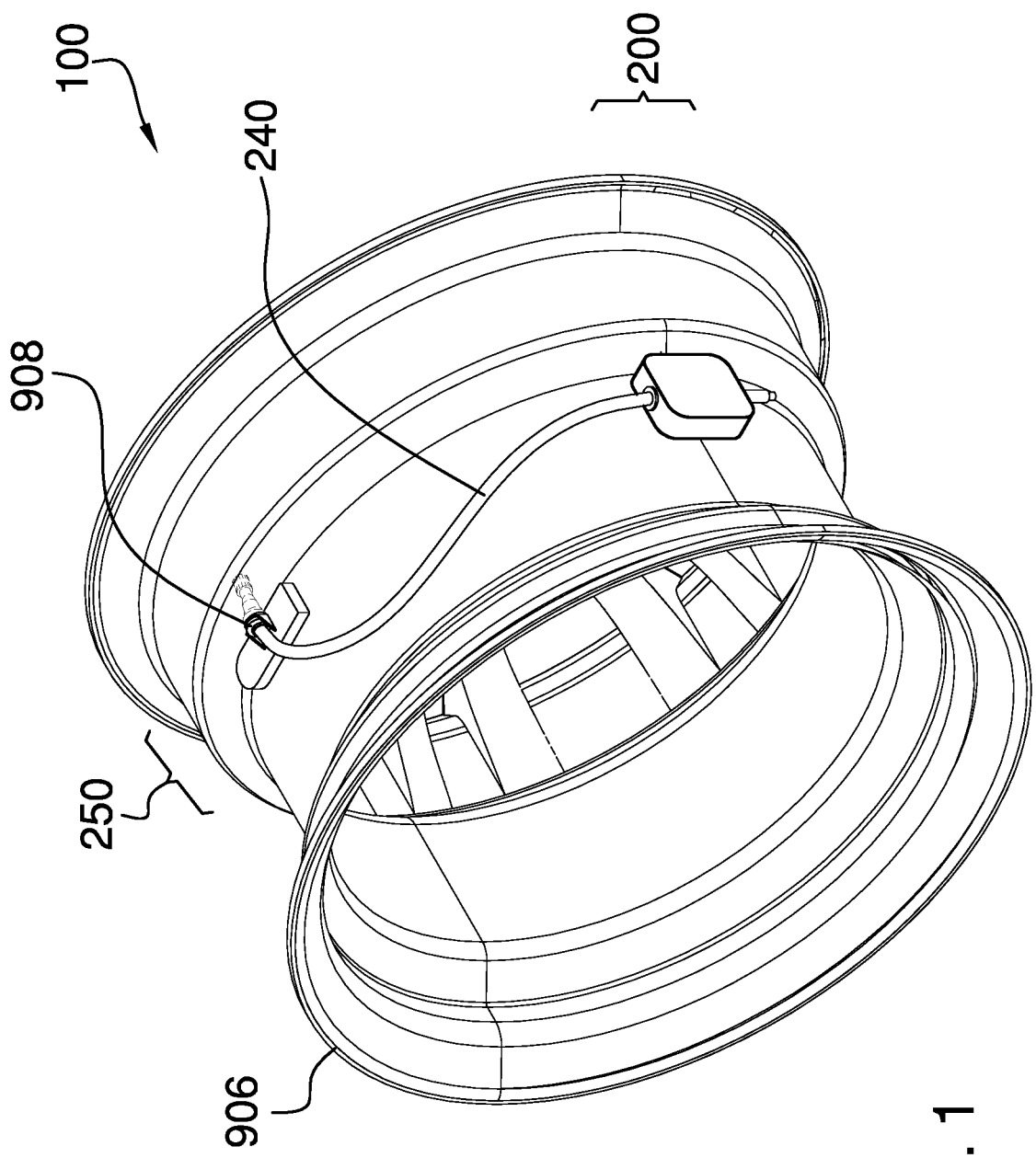
FIG. 1 is an isometric view of an embodiment of the disclosure.
Figure 2:
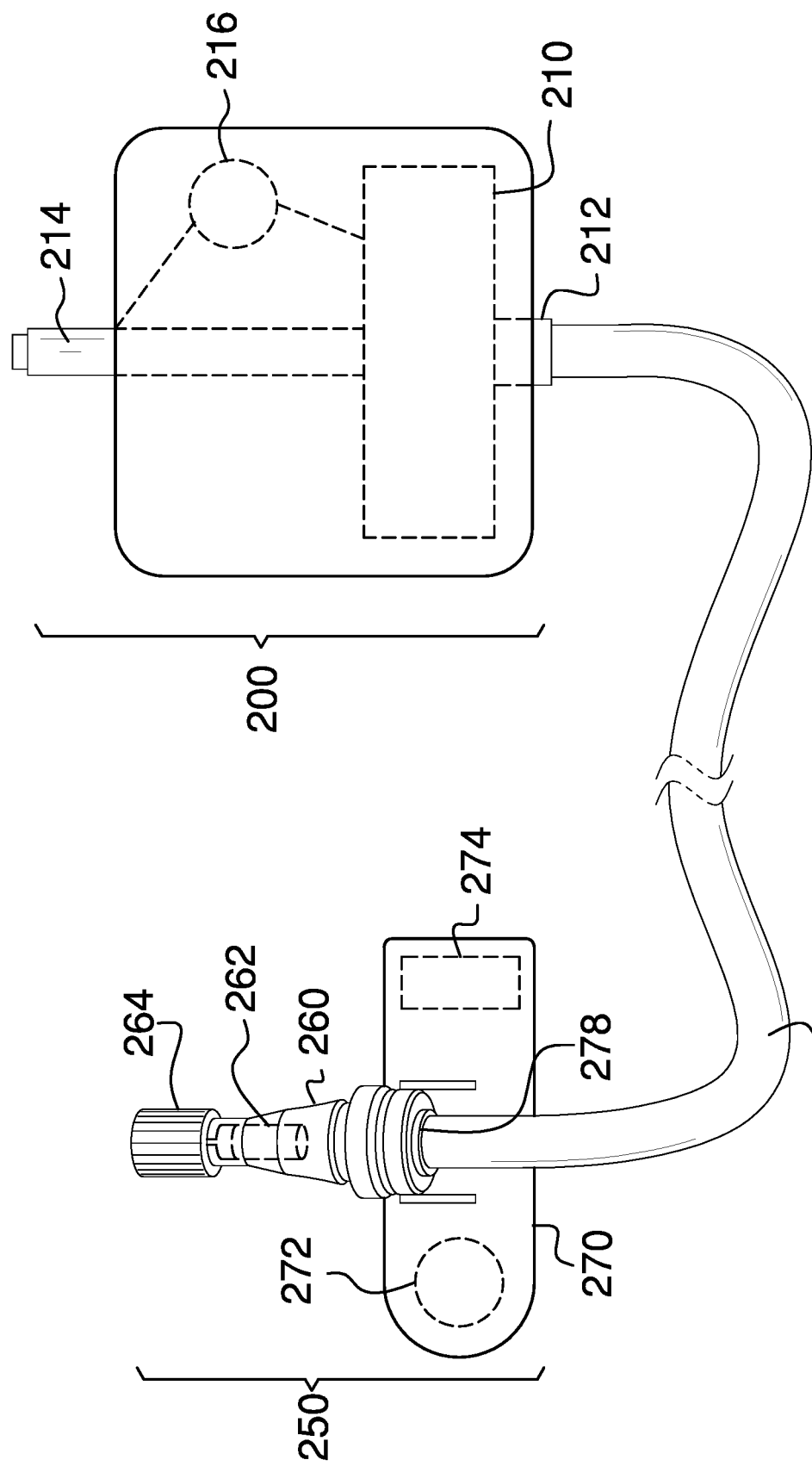
FIG. 2 is a top view of an embodiment of the disclosure.
Figure 3:
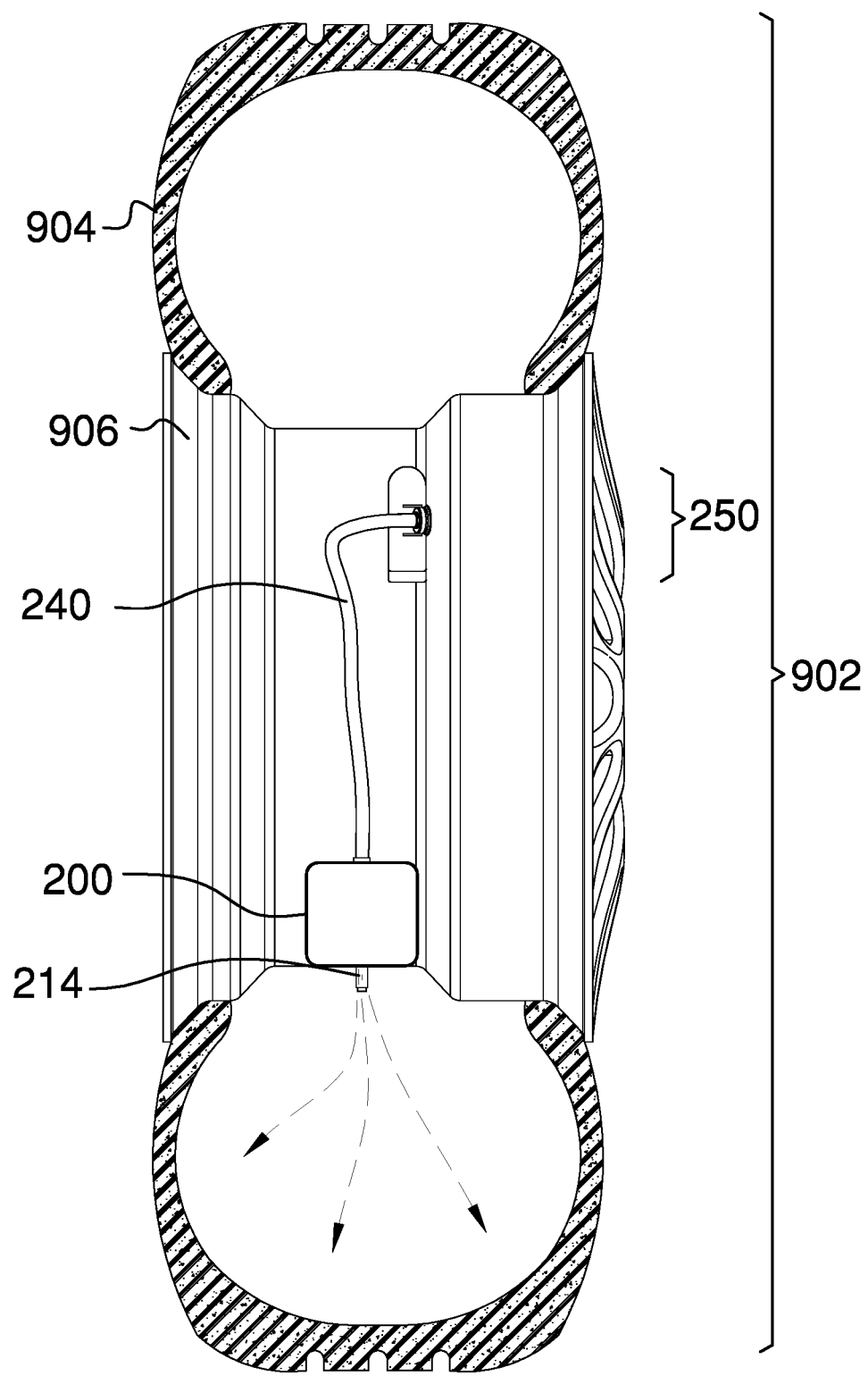
FIG. 3 is an in-use view of an embodiment of the disclosure.

Detailed reference will now be made to a first potential embodiment of the disclosure, which is illustrated in FIGS. 1 through 3.

The vehicle tire inflation system 100 (hereinafter invention) comprises an air jacket 200 and an air hose 240. The air jacket 200 may reside within a wheel 902 of a vehicle and may be mounted to the inside of a rim 906 of the wheel 902. The air jacket 200 may determine that a tire 904 of the wheel 902 has at least partially deflated by sensing that tire pressure within the wheel 902 has dropped below a first pressure threshold. The air jacket 200 may release compressed air within the wheel 902 until the air jacket 200 senses that the tire pressure has reached a second pressure threshold such that the tire 904 may be reinflated. The air hose 240 may be configured to couple the air jacket 200 to a tire pressure monitoring system 250 such that the air jacket 200 has access to an external air supply located outside of the wheel 902 via the tire pressure monitoring system 250.

The first pressure threshold may be lower than a recommended tire pressure range for the tire 904. The second pressure threshold may be higher than the first pressure threshold. The second pressure threshold may be within the recommended tire pressure range.

The air jacket 200 may comprise a compressed air source 210, a jacket air pressure sensor 216, an air release valve 214, and an air inlet 212. The air jacket 200 may release the compressed air within the tire 904 when the tire pressure drops.

The compressed air source 210 may provide the compressed air that may be released inside of the tire 904. The jacket air pressure sensor 216 may determine the tire pressure within the wheel 902.

The jacket air pressure sensor 216 may signal the air jacket 200 when the tire pressure drops below the first pressure threshold. Responsive to the signal from the jacket air pressure sensor 216 that the tire pressure has dropped below the first pressure threshold, the air jacket 200 may activate the compressed air source 210 to release the compressed air into the tire 904.

The jacket air pressure sensor 216 may signal the air jacket 200 when the tire pressure rises above the second pressure threshold. Responsive to the signal from the jacket air pressure sensor 216 that the tire pressure has risen above the second pressure threshold, the air jacket 200 may deactivate the compressed air source 210 to stop the release of the compressed air within the tire 904.

The compressed air may exit the air jacket 200 via the air release valve 214. The air release valve 214 may open to the interior of the wheel 902.

The air inlet 212 may be an aperture that admits air into the air jacket 200. The air inlet 212 may be coupled to the air hose 240 such that air from the external air supply may pass through the tire pressure monitoring system 250 and into the air jacket 200 via the air hose 240 and the air inlet 212.

The air jacket 200 may be powered by a power source. As non-limiting examples, the power source may be a battery, a voltage induced from outside of the tire 904, a kinetic power source energized by rotation of the wheel 902, or combinations thereof.

In some embodiments, the compressed air source 210 may be a compressor. The compressor may be operable to mechanically compress air from the external air supply when activated. The compressor may compress the air to a pressure that is greater than or equal to the recommended tire pressure range.

In some embodiments, the compressed air source 210 may be a compressed air reservoir. The compressed air reservoir may hold the compressed air obtained from the external air supply. The compressed air within the compressed air reservoir may be pressurized to a pressure greater than the recommended tire pressure range. In a preferred embodiment, the compressed air within the compressed air reservoir may be pressurized to 150 to 300 PSI such that the compressed air may be used to reinflate the tire 904 multiple times before the supply of the compressed air is exhausted.

The invention 100 may further comprise the tire pressure monitoring system 250. The tire pressure monitoring system 250 may monitor the tire pressure. The tire pressure monitoring system 250 may transmit a tire pressure alert to the vehicle if the tire pressure drops below a third pressure threshold. The tire pressure monitoring system 250 may cease transmitting the tire pressure alert to the vehicle if the tire pressure rises above a fourth pressure threshold. The tire pressure monitoring system 250 may be configured to couple to the air hose 240 at an air outlet 278 that is located within the wheel 902.

The tire pressure monitoring system 250 may comprise a valve stem 260 and a sensor body 270. The sensor body 270 may reside inside of the rim 906 of the wheel 902. The valve stem 260 may protrude from the sensor body 270 and may pass through a rim aperture 908 such that the valve stem 260 is accessible outside of the wheel 902. The tire pressure monitoring system 250 may be configured to pass air from the external air supply to the air jacket 200 via the air hose 240.

The sensor body 270 may be operable to pass air from the external air supply from the valve stem 260 to the air outlet 278 whenever the air pressure of the external air supply exceeds the air pressure within the air hose 240 and a valve core 262 located within the valve stem 260 is open. As a non-limiting example, the valve core 262 may be opened by when an external pump or compressor is couple to the valve stem 260 by virtue of a fitting pressing the valve core 262 into the valve stem 260.

In some embodiments, a valve cap 264 may cover the end of the valve stem 260 to protect the valve core 262 during normal use.

The sensor body 270 may comprise a TPMS air pressure sensor 272 and a wireless transmitter 274. The TPMS air pressure sensor 272 may determine the tire pressure within the tire 904. The TPMS air pressure sensor 272 may activate the wireless transmitter 274 when the tire pressure is below the third pressure threshold. The TPMS air pressure sensor 272 may deactivate the wireless transmitter 274 when the tire pressure is above the fourth pressure threshold. The wireless transmitter 274 may transmit the tire pressure alert to a receiver within the vehicle when activated. Responsive to the tire pressure alert, the vehicle may be adapted to notify a driver of the vehicle of a low tire pressure condition. As a non-limiting example, the vehicle may illuminate a low tire pressure indicator.

The third pressure threshold may be lower than the recommended tire pressure range for the tire 904. The fourth pressure threshold may be higher than the third pressure threshold. The fourth pressure threshold may be within the recommended tire pressure range.

The first pressure threshold and the third pressure threshold are not required to be the same value and, in fact, will generally not be the same. If the first pressure threshold is higher than the third pressure threshold, then the tire 904 may be reinflated by the air jacket 200 before the tire pressure monitoring system 250 transmits the tire pressure alert and the driver may not be aware that the low tire pressure condition existed. In this scenario, the tire pressure alert may only appear if the air jacket 200 is unable to inflate the tire 904 for some reason and the tire pressure continues to drop. If the first pressure threshold is lower than the third pressure threshold, then the tire pressure alert may be transmitted. If the tire pressure continues to drop the air jacket 200 may eventually reinflate the tire 904 and clear the low tire pressure condition and the low tire pressure indicator. In a preferred embodiment, the first pressure threshold is set to a higher value than the third pressure threshold such that the tire 904 may be reinflated by the air jacket 200 before the tire pressure monitoring system 250 transmits the tire pressure alert.

In a preferred embodiment, the fourth pressure threshold is set to a lower value than the second pressure threshold such that the low tire pressure condition and the low tire pressure indicator are cleared prior to deactivation of the compressed air source 210.

The tire pressure alert may comprise a unique identifier such that the specific tire that is reporting the tire pressure alert may be identified by the vehicle. As non-limiting examples, the unique identifier may be a numeric value or textual string that is included within the tire pressure alert and is unique to the tire pressure monitoring system 250.

In use, a wheel 902 comprising the invention 100 may be installed on a vehicle. If the tire pressure within the wheel 902 drops, the tire pressure may reach the first pressure threshold and the air jacket 200 may activate the compressed air source 210 to release the compressed air. If the tire pressure also reaches the third pressure threshold, the tire pressure monitoring system 250 may transmit the tire pressure alert to the vehicle. The air jacket 200 may release the compressed air until the tire pressure reaches the second pressure threshold, at which point the air jacket 200 may deactivate the compressed air source 210. When the tire pressure reaches the fourth pressure threshold, the tire pressure alert may be cleared. Wheels 902 comprising the invention 100 may be installed at two or more position on the vehicle.

Defintions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface. Aperture may be synonymous with hole, slit, crack, gap, slot, or opening.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

In this disclosure, "compress" may refer to forcing into a smaller space.

In this disclosure, "compressed air" may refer to air that has been compressed to a pressure greater than atmospheric pressure.

Within this disclosure, the word "compressor" may refer to a pump that is dedicated to compressing a fluid or placing a fluid under pressure. The fluid being compressed may be gaseous or liquid.

As used herein, the words "couple", "couples", "coupled" or "coupling", may refer to connecting, either directly or indirectly, and does not necessarily imply a mechanical connection.

As used herein, the word "hose" may include hoses, tubing, piping, and other conduits capable of directing a flow of a gas or a liquid. When referring to a hose in this disclosure, the terms inner diameter and outer diameter are used as they would be used by those skilled in the plumbing arts.

As used in this disclosure, the word "interior" may be used as a relational term that implies that an object is located or contained within the boundary of a structure or a space.

As used herein, "recommended tire pressure" or "recommended tire pressure range" may refer to an air pressure measurement or a range of air pressure measurements that the manufacturer of a tire, a vehicle, or both suggest as appropriate inflation for the tire on the vehicle for reasons of comfort, safety, durability, or combinations thereof.

As used herein, "reservoir" may refer to a container or containment system that is configured to store a liquid, gas, or gel.

As used in this disclosure, a "sensor" may be a device that quantitatively measures a physical stimulus.

As used in this disclosure, a "valve" may be a device that is used to control the flow of a fluid, either gas or liquid, through a pipe or to control the flow of a fluid into and out of a container. Some valves may have multiple ports and may allow the diverting or mixing of fluids.

As used in this disclosure, "wireless" may be an adjective that is used to describe a communication channel that does not require the use of physical cabling.

With respect to the above description, it is to be realized that the optimum dimensional relationship for the various components of the invention described above and in FIGS. 1 through 3, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicle tire inflation system comprising:
an air jacket and an air hose;
wherein the air jacket resides within a wheel of a vehicle and is mounted to the inside of a rim of the wheel;
wherein the air jacket determines that a tire of the wheel has at least partially deflated by sensing that tire pressure within the wheel has dropped below a first pressure threshold;
wherein the air jacket releases compressed air within the wheel until the air jacket senses that the tire pressure has reached a second pressure threshold such that the tire is reinflated;
wherein the air hose is configured to couple the air jacket to a tire pressure monitoring system such that the air jacket has access to an external air supply located outside of the wheel via the tire pressure monitoring system;
wherein the air jacket comprises a compressed air source, a jacket air pressure sensor, an air release valve, and an air inlet;
wherein the air jacket releases the compressed air within the tire when the tire pressure drops;
wherein the compressed air source is a compressed air reservoir;
wherein the compressed air reservoir holds the compressed air obtained from the external air supply;
wherein the compressed air within the compressed air reservoir is pressurized to a pressure greater than the recommended tire pressure range.

2. The vehicle tire inflation system according to claim 1 wherein the first pressure threshold is lower than a recommended tire pressure range for the tire;

wherein the second pressure threshold is higher than the first pressure threshold;
wherein the second pressure threshold is within the recommended tire pressure range.

3. The vehicle tire inflation system according to claim 2
wherein the compressed air source provides the compressed air that is released inside of the tire;
wherein the jacket air pressure sensor determines the tire pressure within the wheel.

4. The vehicle tire inflation system according to claim 3
wherein the jacket air pressure sensor signals the air jacket when the tire pressure drops below the first pressure threshold;
wherein responsive to the signal from the jacket air pressure sensor that the tire pressure has dropped below the first pressure threshold, the air jacket activates the compressed air source to release the compressed air into the tire.

5. The vehicle tire inflation system according to claim 4
wherein the jacket air pressure sensor signals the air jacket when the tire pressure rises above the second pressure threshold;
wherein responsive to the signal from the jacket air pressure sensor that the tire pressure has risen above the second pressure threshold, the air jacket deactivates the compressed air source to stop the release of the compressed air within the tire.

6. The vehicle tire inflation system according to claim 5
wherein the compressed air exits the air jacket via the air release valve;
wherein the air release valve opens to the interior of the wheel.

7. The vehicle tire inflation system according to claim 6
wherein the air inlet is an aperture that admits air into the air jacket;
wherein the air inlet is coupled to the air hose such that air from the external air supply passes through the tire pressure monitoring system and into the air jacket via the air hose and the air inlet.

8. The vehicle tire inflation system according to claim 7
wherein the compressed air source is a compressor;
wherein the compressor is operable to mechanically compress air from the external air supply when activated;
wherein the compressor compresses the air to a pressure that is greater than or equal to the recommended tire pressure range.

9. The vehicle tire inflation system according to claim 7
wherein the compressed air within the compressed air reservoir is pressurized to 150 to 300 PSI such that the compressed air is used to reinflate the tire multiple times before the supply of the compressed air is exhausted.

10. The vehicle tire inflation system according to claim 7
wherein the vehicle tire inflation system further comprises the tire pressure monitoring system;
wherein the tire pressure monitoring system monitors the tire pressure;
wherein the tire pressure monitoring system transmits a tire pressure alert to the vehicle if the tire pressure drops below a third pressure threshold;
wherein the tire pressure monitoring system ceases transmitting the tire pressure alert to the vehicle if the tire pressure rises above a fourth pressure threshold;
wherein the tire pressure monitoring system is configured to couple to the air hose at an air outlet that is located within the wheel.

11. The vehicle tire inflation system according to claim 10
wherein the tire pressure monitoring system comprises a valve stem and a sensor body;
wherein the sensor body resides inside of the rim of the wheel;
wherein the valve stem protrudes from the sensor body and passes through a rim aperture such that the valve stem is accessible outside of the wheel;
wherein the tire pressure monitoring system is configured to pass air from the external air supply to the air jacket via the air hose.

12. The vehicle tire inflation system according to claim 11
wherein the sensor body is operable to pass air from the external air supply from the valve stem to the air outlet whenever the air pressure of the external air supply exceeds the air pressure within the air hose and a valve core located within the valve stem is open.

13. The vehicle tire inflation system according to claim 12
wherein the sensor body comprises a TPMS air pressure sensor and a wireless transmitter;
wherein the TPMS air pressure sensor determines the tire pressure within the tire;
wherein the TPMS air pressure sensor activates the wireless transmitter when the tire pressure is below the third pressure threshold;
wherein the TPMS air pressure sensor deactivates the wireless transmitter when the tire pressure is above the fourth pressure threshold;
wherein the wireless transmitter transmits the tire pressure alert to a receiver within the vehicle when activated;
wherein responsive to the tire pressure alert, the vehicle is adapted to notify a driver of the vehicle of a low tire pressure condition.

14. The vehicle tire inflation system according to claim 13
wherein the third pressure threshold is lower than the recommended tire pressure range for the tire;
wherein the fourth pressure threshold is higher than the third pressure threshold;
wherein the fourth pressure threshold is within the recommended tire pressure range.

15. The vehicle tire inflation system according to claim 14
wherein the first pressure threshold is set to a higher value than the third pressure threshold such that the tire is reinflated by the air jacket before the tire pressure monitoring system transmits the tire pressure alert.

16. The vehicle tire inflation system according to claim 15
wherein the fourth pressure threshold is set to a lower value than the second pressure threshold such that the low tire pressure condition and a low tire pressure indicator are cleared prior to deactivation of the compressed air source.

17. The vehicle tire inflation system according to claim 16
wherein the tire pressure alert comprises a unique identifier such that the specific tire that is reporting the tire pressure alert is identified by the vehicle.

* * * * *